United States Patent
Ichikawa

(10) Patent No.: US 8,643,910 B2
(45) Date of Patent: Feb. 4, 2014

(54) IMAGE FORMING APPARATUS AND IMAGE FORMING METHOD INCLUDING A FIRST MEASURING UNIT THAT MEASURES INVISIBLE TONER

(75) Inventor: Junichi Ichikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 364 days.

(21) Appl. No.: 13/192,103

(22) Filed: Jul. 27, 2011

(65) Prior Publication Data

US 2012/0218566 A1 Aug. 30, 2012

(30) Foreign Application Priority Data

Feb. 24, 2011 (JP) ................................. 2011-038819

(51) Int. Cl.
*H04N 1/40* (2006.01)
(52) U.S. Cl.
USPC ............ 358/443; 358/462; 358/464; 358/1.9; 358/300; 358/3.27; 382/162; 382/163; 382/173; 382/176; 382/180; 382/254; 382/255; 382/268; 382/274; 399/3; 399/130; 399/168; 399/177; 399/178; 399/180
(58) Field of Classification Search
None
See application file for complete search history.

(56) References Cited

U.S. PATENT DOCUMENTS

| | | | |
|---|---|---|---|
| 2002/0037103 A1* | 3/2002 | Hong et al. | 382/173 |
| 2007/0057987 A1* | 3/2007 | Miyamoto et al. | 347/19 |
| 2007/0165095 A1* | 7/2007 | Aoki et al. | 347/224 |
| 2007/0236745 A1* | 10/2007 | Noguchi et al. | 358/3.24 |
| 2008/0193860 A1* | 8/2008 | Hains | 430/5 |
| 2009/0086245 A1* | 4/2009 | Sugiyama | 358/1.13 |

FOREIGN PATENT DOCUMENTS

| | | |
|---|---|---|
| JP | 07-271081 A | 10/1995 |
| JP | 2005-233990 A | 9/2005 |
| JP | 2007-228193 A | 9/2007 |
| JP | 2008-077538 A | 4/2008 |

* cited by examiner

*Primary Examiner* — Miya J Cato
(74) *Attorney, Agent, or Firm* — Sughrue Mion, PLLC

(57) ABSTRACT

An image forming apparatus includes an acquiring unit that acquires image data expressing an image region included in an image with a first value and a background region included in the image with a second value; a segmenting unit that segments the image region into multiple segments arranged in a fast scanning direction; a converting unit that converts a value of at least one of the segments into the second value; an output unit that generates an image signal on the basis of the image data and outputs the image signal; an exposure unit that exposes a charged image bearing member to light according to the output image signal by scanning the light thereto in the fast scanning direction so as to form a latent image; and a developing unit that forms the image by developing the latent image using an invisible toner that absorbs infrared light or ultraviolet light.

14 Claims, 10 Drawing Sheets

|  |  | NUMBER OF ON SEGMENTS | NUMBER OF OFF SEGMENTS 51 |
|---|---|---|---|
| IMAGE PATTERN 1 |  | 13 | 12 |
| IMAGE PATTERN 2 |  | 20 | 5 |
| IMAGE PATTERN 3 |  | 8 | 17 |

IMAGE FORMING APPARATUS AND IMAGE FORMING METHOD INCLUDING A FIRST MEASURING UNIT THAT MEASURES INVISIBLE TONER

CROSS-REFERENCE TO RELATED APPLICATIONS

This application is based on and claims priority under 35 USC 119 from Japanese Patent Application No. 2011-038819 filed Feb. 24, 2011.

BACKGROUND (i) Technical Field

The present invention relates to image forming apparatuses and image forming methods.

SUMMARY

According to an aspect of the invention, there is provided an image forming apparatus including an acquiring unit, a segmenting unit, a converting unit, an output unit, an exposure unit, and a developing unit. The acquiring unit acquires image data expressing an image region included in an image with a first value and a background region included in the image with a second value. The segmenting unit segments the image region expressed with the first value in the acquired image data into multiple segments arranged in a fast scanning direction. The converting unit converts a value of at least one of the multiple segments arranged in the fast scanning direction into the second value. The output unit generates an image signal on the basis of the image data, in which the value of the at least one segment is converted, and outputs the image signal. The exposure unit exposes a charged image bearing member to light according to the output image signal by scanning the light thereto in the fast scanning direction so as to form a latent image. The developing unit forms the image by developing the formed latent image using an invisible toner that absorbs infrared light or ultraviolet light.

BRIEF DESCRIPTION OF THE DRAWINGS

An exemplary embodiment of the present invention will be described in detail based on the following figures, wherein.

DETAILED DESCRIPTION

Figure 1:
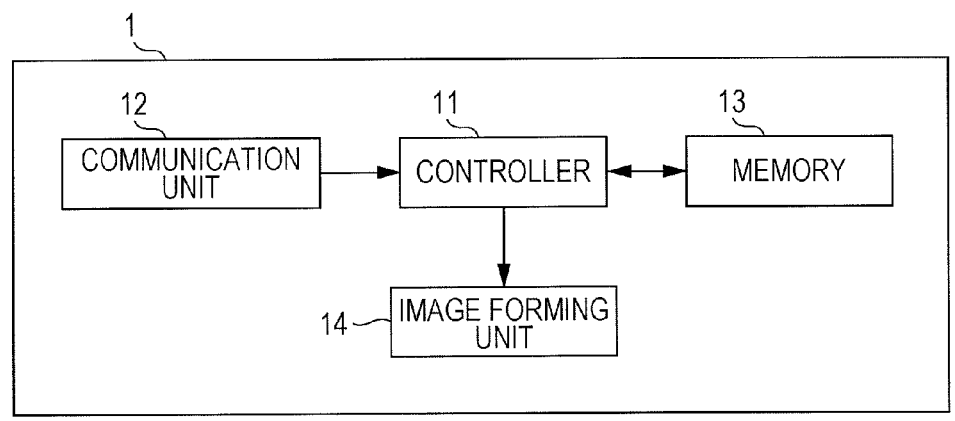
FIG. 1 illustrates the configuration of an image forming apparatus.

FIG. 1 illustrates the configuration of an image forming apparatus 1 according to an exemplary embodiment of the invention. The image forming apparatus 1 includes a controller 11, a communication unit 12, a memory 13, and an image forming unit 14. The controller 11 includes a central processing unit (CPU) and a memory. The CPU executes a program stored in the memory so as to control each component in the image forming apparatus 1. The communication unit 12 performs communication with a terminal apparatus (not shown) via a communication line. The memory 13 includes, for example, a hard disk and stores various kinds of data.

Figure 2:
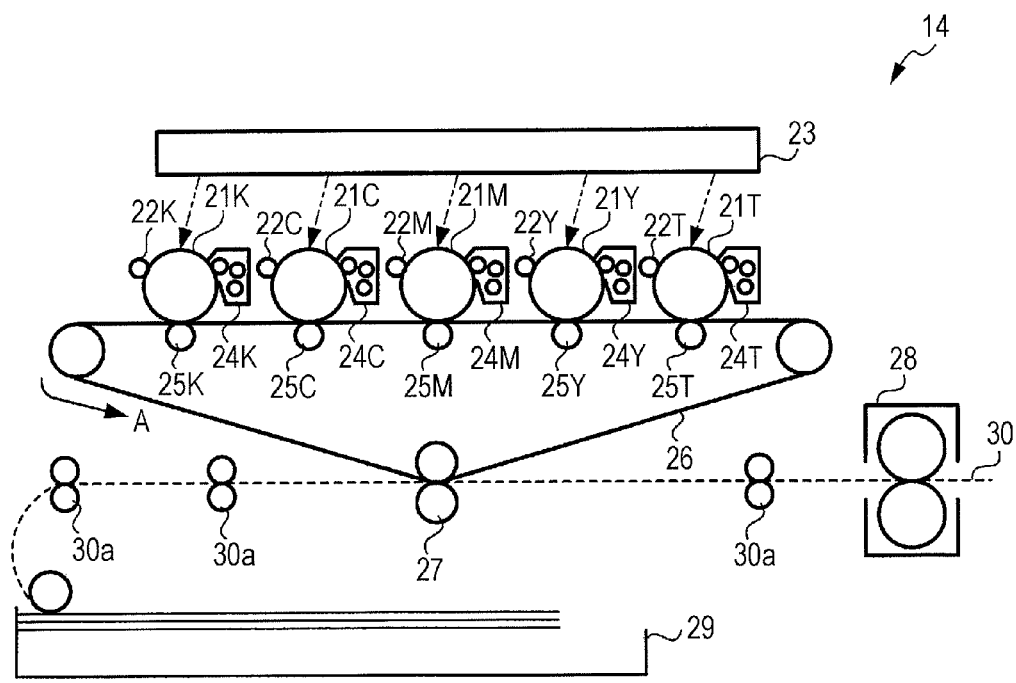
FIG. 2 illustrates the configuration of an image forming unit.

FIG. 2 illustrates the configuration of the image forming unit 14. The image forming unit 14 includes photoconductor drums 21Y, 21M, 21C, 21K, and 21T. Each of the photoconductor drums 21Y, 21M, 21C, 21K, and 21T has a photosensitive layer and rotates about a shaft. The photoconductor drums 21Y, 21M, 21C, 21K, and 21T are respectively surrounded by chargers 22Y, 22M, 22C, 22K, and 22T, an exposure device 23, developing devices 24Y, 24M, 24C, 24K, and 24T, and first-transfer rollers 25Y, 25M, 25C, 25K, and 25T.

The chargers 22Y, 22M, 22C, 22K, and 22T uniformly electrostatically-charge the surfaces of the photoconductor drums 21Y, 21M, 21C, 21K, and 21T, respectively. The exposure device 23 exposes the electrostatically-charged photoconductor drums 21Y, 21M, 21C, 21K, and 21T to light so as to form electrostatic latent images thereon. The developing devices 24Y, 24M, 24C, 24K, and 24T develop the electrostatic latent images formed on the photoconductor drums 21Y, 21M, 21C, 21K, and 21T by using toner so as to form toner images. The developing devices 24Y, 24M, 24C, and 24K form the toner images by using yellow, magenta, cyan, and black toners, respectively. The developing device 24T forms the toner image by using an invisible toner. This invisible toner is substantially transparent relative to visible light and absorbs infrared light or ultraviolet light. Since such an invisible toner slightly absorbs visible light, the toner readily becomes visually recognizable as the amount of toner increases. The term "invisible" refers to a state in which an object is difficult to visually recognize, regardless of whether the object is visually recognizable in actuality.

The first-transfer rollers 25Y, 25M, 25C, 25K, and 25T transfer the toner images formed on the photoconductor drums 21Y, 21M, 21C, 21K, and 21T onto an intermediate transfer belt 26. The intermediate transfer belt 26 rotates in a direction indicated by an arrow A in FIG. 2 so as to transport the toner images transferred thereto by the first-transfer rollers 25Y, 25M, 25C, 25K, and 25T to a second-transfer roller 27. The second-transfer roller 27 transfers the toner images transported thereto by the intermediate transfer belt 26 to a recording medium. This recording medium is, for example, a sheet of paper. A fixing unit 28 fixes the toner images onto the recording medium by applying heat and pressure thereto. A feeding unit 29 accommodates multiple recording media and feeds the accommodated recording media in a one-by-one manner. A transport unit 30 has multiple transport rollers 30a and transports each recording medium fed from the feeding unit 29 to an outlet via the second-transfer roller 27 and the fixing unit 28.

Figure 3:
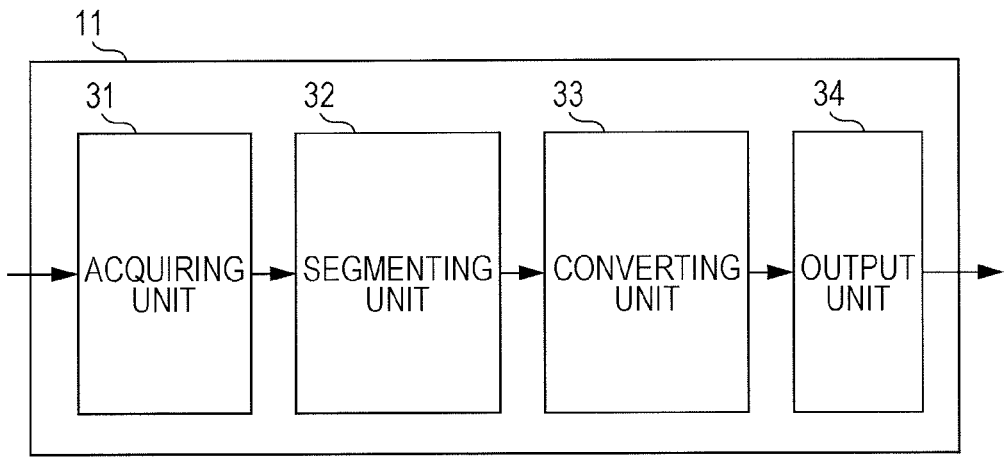
FIG. 3 illustrates a functional configuration of a controller.

FIG. 3 illustrates a functional configuration of the controller 11. The controller 11 functions as an acquiring unit 31, a segmenting unit 32, a converting unit 33, and an output unit 34. The acquiring unit 31 acquires image data that expresses a code image. This image data expresses an image region included in the code image with a first value and expresses a background region included in the code image with a second value. The acquiring unit 31 may acquire the image data from outside the image forming apparatus 1 or from inside the image forming apparatus 1. For example, if the controller 11 has a function of generating image data expressing a code image, the acquiring unit 31 may acquire the image data generated by this function. The segmenting unit 32 segments the image region expressed with the first value in the image data acquired by the acquiring unit 31 into multiple segments arranged in a fast scanning direction. The converting unit 33 converts a value of at least one of the multiple segments arranged in the fast scanning direction into the second value. The output unit 34 generates an image signal on the basis of the image data, in which the value of the aforementioned segment has been converted, and outputs the image signal.

Figure 4:
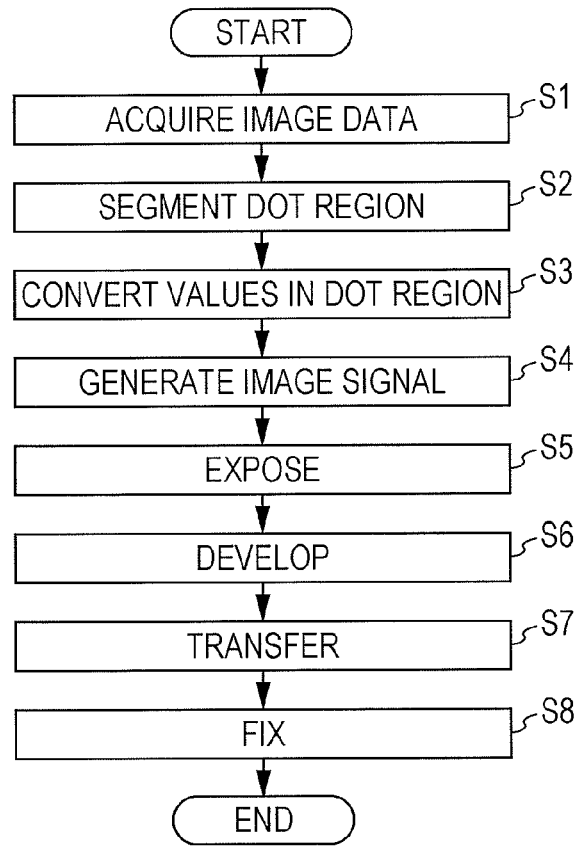
FIG. 4 is a flowchart illustrating a process for forming a code image.

The image forming apparatus 1 performs a process for forming a code image. A code image expresses specific information based on an array of dots formed using the invisible toner. A code image includes small rectangular dots and a background. FIG. 4 is a flowchart illustrating the process for forming a code image. In step S1, the controller 11 acquires image data expressing a code image. For example, the controller 11 receives image data transmitted from the terminal apparatus (not shown) via the communication unit 12. Alternatively, the controller 11 generates image data that expresses a code image. In this case, the generated image data is acquired in step S1. The image data expresses a dot region 41 (an example of the image region), in which dots are rendered, with a value "1" (an example of the first value), and expresses a background region with a value "0" (an example of the second value).

Figure 5:
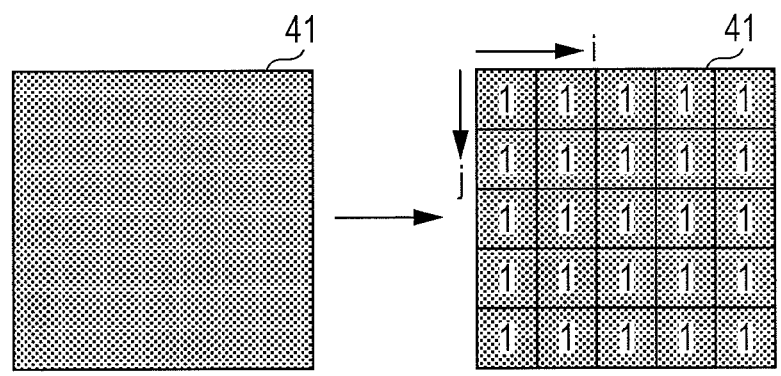
FIG. 5 illustrates an example of how a dot region is segmented.

In step S2, the controller 11 identifies the dot region 41 expressed with the value "1" in the acquired image data. Then, the controller 11 segments the identified dot region 41 into multiple segments. FIG. 5 illustrates an example of how the dot region 41 is segmented. In the example shown in FIG. 5, the controller 11 segments the dot region 41 into 5×5 segments in an i direction and a j direction. The i direction corresponds to the fast scanning direction of the exposure device 23, and the j direction corresponds to a slow scanning direction of the exposure device 23.

Figure 6:
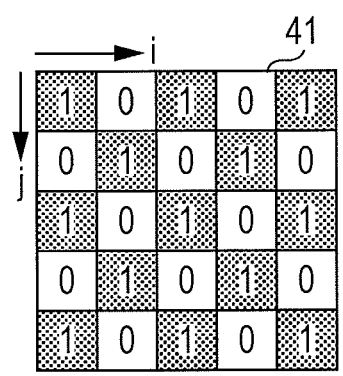
FIG. 6 illustrates an example of the dot region after conversion.

In step S3, the controller 11 converts the values in the dot region 41. FIG. 6 illustrates an example of the dot region 41 after the conversion. In the example shown in FIG. 6, the controller 11 converts the value of every other segment to "0" so that adjacent segments are expressed with different values. However, the controller 11 does not convert the values expressing the segments located at the four corners of the dot region 41. In other words, the controller 11 converts the value of every other segment to "0", starting from segments adjacent to the segments located at the four corners of the dot region 41.

Figure 7:
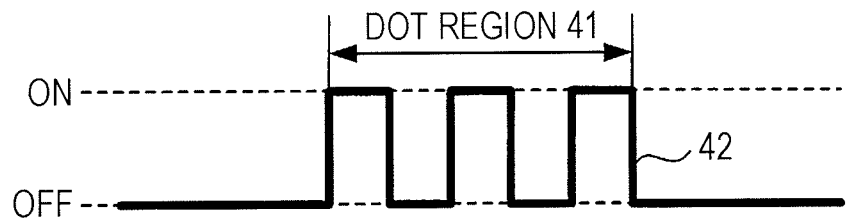
FIG. 7 illustrates an example of an image signal.

In step S4, the controller 11 generates an image signal 42 in accordance with the image data converted in step S3. FIG. 7 illustrates the image signal 42 generated for the first row of the dot region 41 shown in FIG. 6. In this image signal 42, a period corresponding to each segment expressed with the value "1" in the first row of the dot region 41 is "ON", whereas a period corresponding to each segment expressed with the value "0" is "OFF". The controller 11 outputs the generated image signal 42 to the exposure device 23.

Figure 8:
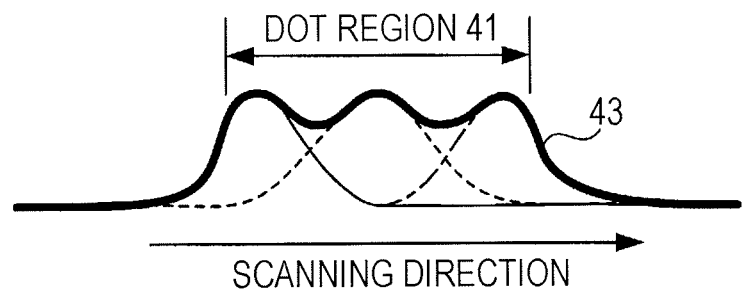
FIG. 8 illustrates an example of exposure intensity distribution.

In step S5, the exposure device 23 (an example of an exposure unit) receives the image signal 42 output from the controller 11. Subsequently, the exposure device 23 scans light according to the received image signal 42 so as to expose the electrostatically-charged photoconductor drum 21T to the light. Specifically, the exposure device 23 emits a laser beam during an ON period of the image signal 42 and stops emitting the laser beam during an OFF period of the image signal 42. In this case, the dot region 41 is intermittently exposed to the laser beam in the fast scanning direction. FIG. 8 illustrates exposure intensity distribution 43 when the exposure process is performed on the basis of the image signal 42 shown in FIG. 7. As shown in FIG. 8, when the exposure process is intermittently performed in the fast scanning direction, the exposure intensity distribution 43 in the dot region 41 has a shape that is almost flat. This is because the laser beam has Gaussian distribution.

Figure 9:
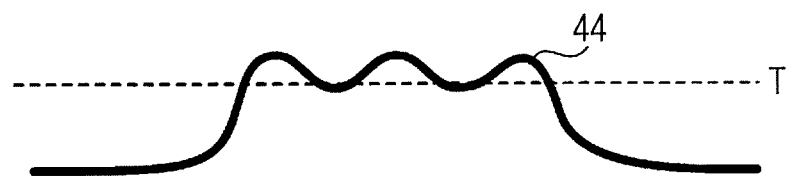
FIG. 9 illustrates an example of toner-amount distribution.

In step S6, the developing device 24T (an example of a developing unit) develops an electrostatic latent image formed on the photoconductor drum 21T by using the invisible toner so as to form a code image. FIG. 9 illustrates toner-amount distribution 44 in the code image that is formed when the exposure process is performed on the basis of the exposure intensity distribution 43 shown in FIG. 8. As shown in FIG. 9, when the exposure process is performed on the basis of the exposure intensity distribution 43 shown in FIG. 8, the toner-amount distribution 44 in the dot region 41 has a shape that is almost flat, like the exposure intensity distribution 43. In addition, the amount of toner in the dot region 41 is greater than a minimum amount T of toner required for reading an image.

In step S7, the first-transfer roller 25T (an example of a transfer unit) transfers the code image formed on the photoconductor drum 21T onto the intermediate transfer belt 26 (an example of a transfer medium). The intermediate transfer belt 26 transports the code image to the second-transfer roller 27. The second-transfer roller 27 transfers the code image transported by the intermediate transfer belt 26 onto a recording medium. The transport unit 30 transports the recording medium having the transferred code image to the fixing unit 28.

In step S8, the fixing unit 28 fixes the code image onto the recording medium by applying heat and pressure thereto. The transport unit 30 transports the recording medium traveling through the fixing unit 28 to the outlet. Consequently, the recording medium having the code image formed thereon is discharged from the image forming apparatus 1. The code image formed on the recording medium is read by a scanner that emits infrared light or ultraviolet light. Accordingly, specific information expressed by an array of dots in the code image is recognized.

Figure 10:
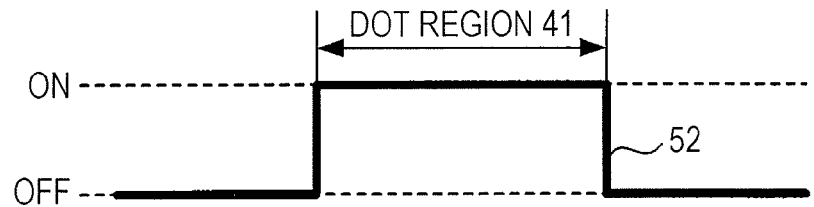
FIG. 10 illustrates an image signal according to a process in the related art.
Figure 11:
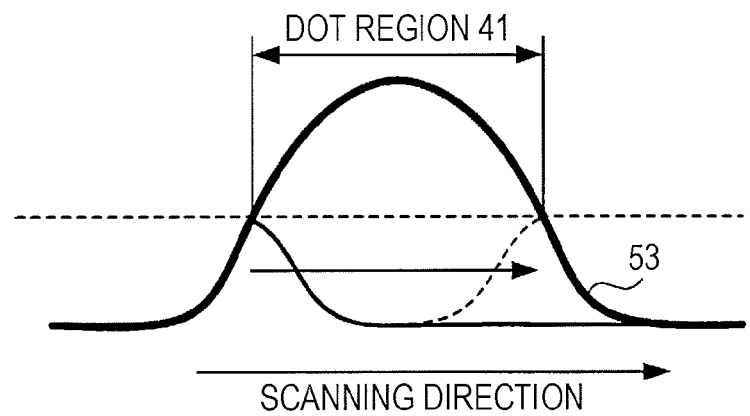
FIG. 11 illustrates exposure intensity distribution according to the process in the related art.
Figure 12:
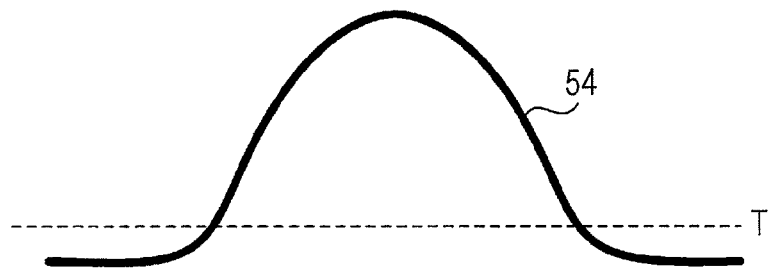
FIG. 12 illustrates toner-amount distribution according to the process in the related art.

Next, a process for forming a code image in the related art will be described. Since the segmentation in step S2 and the conversion in step S3 are not performed in the process in the related art, the dot region 41 is entirely expressed with the value "1". In this case, an image signal 52 shown in FIG. 10 is generated for the first row of the dot region 41. In the image signal 52, a period corresponding to the dot region 41 is constantly "ON". When this image signal 52 is generated, the dot region 41 is continuously exposed to light in the fast scanning direction. When the exposure process is continuously performed in the fast scanning direction, exposure intensity distribution 53 in the dot region 41 has a shape that increases in the center, as shown in FIG. 11. This is because, when a laser beam is continuously emitted, the exposure intensity accumulates and increases due to Gaussian distribution of the laser beam. When the exposure process is performed on the basis of the exposure intensity distribution 53, toner-amount distribution 54 in a code image has a shape similar to that of the exposure intensity distribution 53, as shown in FIG. 12. In this toner-amount distribution 54, the amount of toner in the dot region 41 increases in the center. Therefore, the center of the dot region 41 has an excessive amount of invisible toner and is readily visually recognizable.

Because the code image formed by the process shown in FIG. 4 has a uniform and smaller amount of toner in the dot region 41 as compared with the code image formed by the process in the related art, the code image formed by the process shown in FIG. 4 is difficult to visually recognize. In addition, in the code image formed by the process shown in FIG. 4, the amount of toner in the dot region 41 is greater than the minimum amount T of toner required for reading an image, whereby sufficient reading accuracy may be achieved when the information is read by using a scanner.

The invention is not limited to the exemplary embodiment described above, and modifications are permissible. Some of the modifications will be described below. These modifications may also be combined with each other.

First Modification

Figure 13:
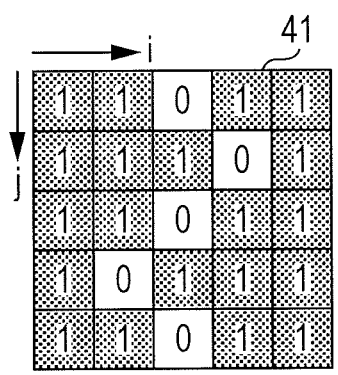
FIG. 13 illustrates an example of the dot region after conversion according to a modification.

A conversion pattern of the dot region 41 is not limited to that described in the exemplary embodiment. The controller 11 may convert the value of at least one of the multiple segments arranged in the fast scanning direction into "0". For example, the controller 11 may convert the value of a segment other than the segments located at the ends in the i direction into "0". FIG. 13 illustrates an example of the dot region 41 after the conversion according to this modification. In the example shown in FIG. 13, regarding each row of multiple segments arranged in the i direction, the controller 11 converts the value of a single segment other than the segments located at the ends in the i direction into "0". The reason that the values of the segments located at the ends in the i direction are not converted and are remained as "1" is to prevent the width of the dot region 41 in the fast scanning direction from being reduced.

Figure 14:
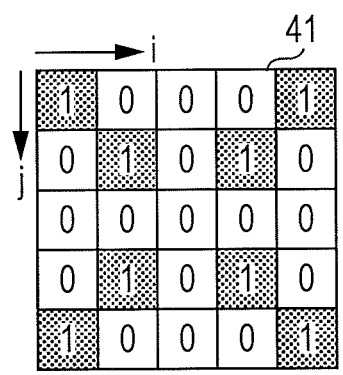
FIG. 14 illustrates another example of the dot region after conversion according to the modification.

Alternatively, the controller 11 may convert the values of segments other than the segments located at the four corners of the dot region 41 into "0". FIG. 14 illustrates another example of the dot region 41 after the conversion according to this modification. In the example shown in FIG. 14, regarding each row of multiple segments arranged in the direction, the controller 11 converts the values of at least three segments other than the segments located at the four corners of the dot region 41 into "0". The reason that the values of the segments located at the four corners of the dot region 41 are not converted and are remained as "1" is to prevent the outer edges of the dot region 41 from being reduced in size.

Second Modification

Figure 15:
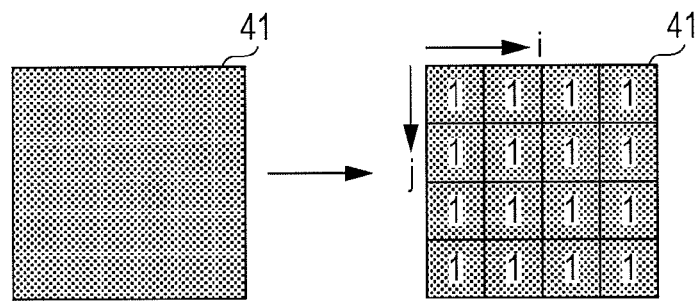
FIG. 15 illustrates an example of how the dot region is segmented in accordance with another modification.
Figure 16:
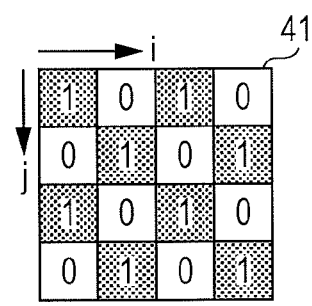
FIG. 16 illustrates an example of the dot region after conversion according to the modification.
Figure 17:
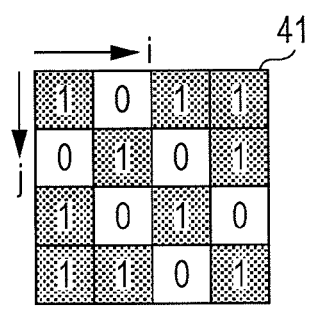
FIG. 17 illustrates another example of the dot region after conversion according to the modification.

The dot region 41 does not necessarily need to be segmented into 5×5 segments. For example, as shown in FIG. 15, the controller 11 may segment the dot region 41 into 4×4 segments. In this case, the controller 11 may convert the values of these segments as shown in FIG. 16. In the example shown in FIG. 16, the controller 11 converts the value of every other segment to "0" so that adjacent segments are expressed with different values. Alternatively, the controller 11 may convert the values of the segments as shown in FIG. 17. The example shown in FIG. 17 is basically similar to the example shown in FIG. 16 in that the controller 11 converts the value of every other segment to "0" so that adjacent segments are expressed with different values, but the values of the segments located at the four corners of the dot region 41 are not converted and are remained as "1".

Figure 18:
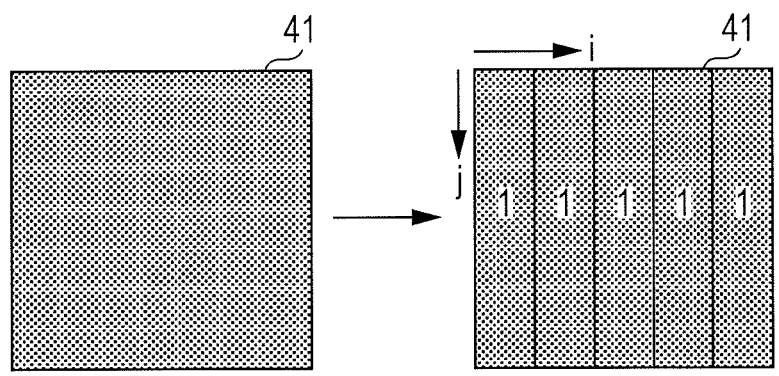
FIG. 18 illustrates another example of how the dot region is segmented in accordance with the modification.
Figure 19:
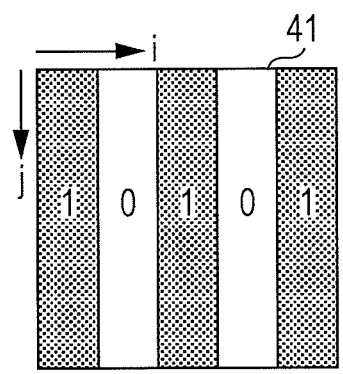
FIG. 19 illustrates another example of the dot region after conversion according to the modification.

Alternatively, the controller 11 may segment the dot region 41 into multiple segments arranged in the i direction as shown in FIG. 18. In this case, the controller 11 may convert the values of the segments as shown in FIG. 19. In the example shown in FIG. 19, the controller 11 converts the value of every other segment to "0" so that adjacent segments are expressed with different values. Even when the dot region 41 is segmented in the i direction and the j direction as in the exemplary embodiment described above, the values in the dot region 41 may be converted as in FIG. 19. In this case, the controller 11 converts the values of the multiple segments for every other column so that multiple first segments arranged in the j direction and multiple second segments arranged in the j direction and adjacent to the first segments are expressed with different values.

Third Modification

Figure 20:
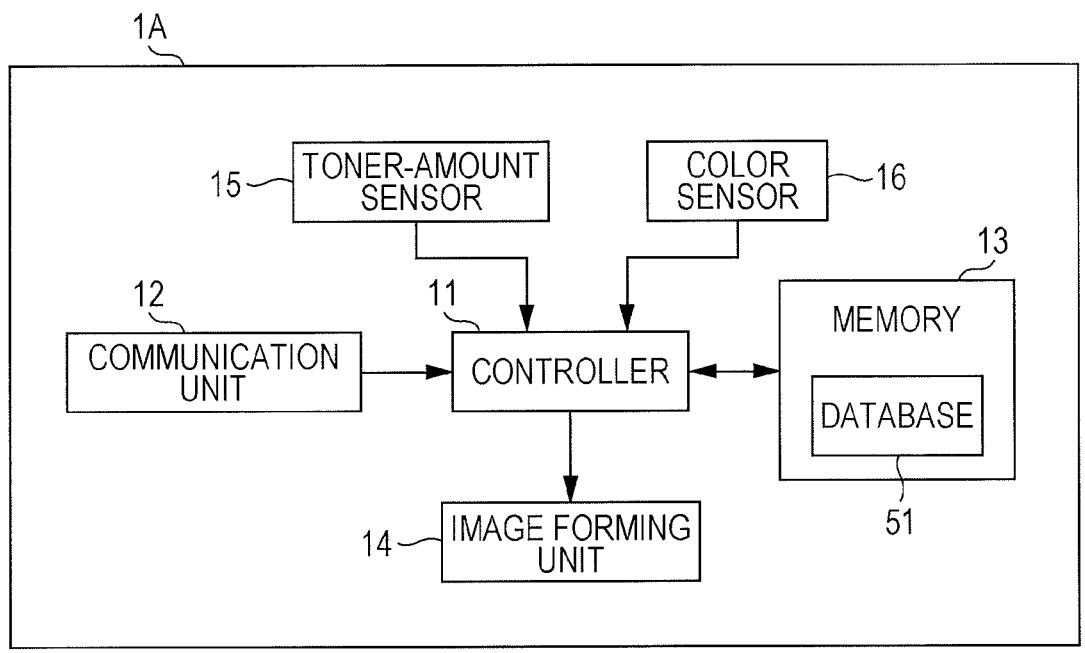
FIG. 20 illustrates the configuration of an image forming apparatus according to another modification.

The conversion pattern of the dot region 41 may be changed in accordance with the state of dots formed by the developing device 24T. FIG. 20 illustrates the configuration of an image forming apparatus 1A according to this modification. In addition to the controller 11, the communication unit 12, the memory 13, and the image forming unit 14 described above, the image forming apparatus 1A includes a toner-amount sensor 15 and a color sensor 16. The toner-amount sensor 15 (an example of a first measuring unit) is provided above the intermediate transfer belt 26. The toner-amount sensor 15 emits light to a code image and detects reflected light thereof after the code image is transferred onto the intermediate transfer belt 26 in step S7, so as to measure the amount of invisible toner forming the code image. For example, the toner-amount sensor 15 measures the amount of invisible toner forming the code image on the basis of the intensity of light scattered due to the invisible toner. The color sensor 16 (an example of a second measuring unit) is provided above the transport unit 30 at a position between the second-transfer roller 27 and the outlet. The color sensor 16 emits light to the code image and analyzes color components in reflected light thereof after the code image is transferred in step S7, so as to measure color values expressing the colors in the code image. For example, the color sensor 16 separates the reflected light into red (R), green (G), and blue (B) color signals and detects the color signals so as to measure RGB values.

Figure 21:
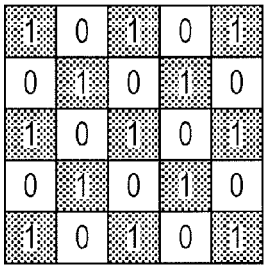
FIG. 21 illustrates an example of a database for image patterns according to the modification.
Figure 21:
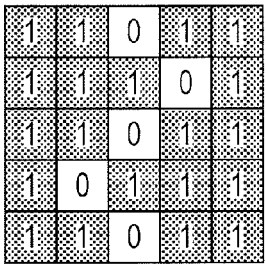
Figure 21:
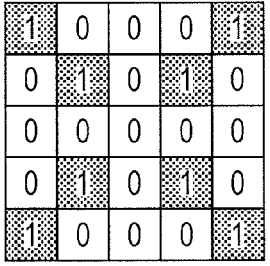

The memory 13 stores a database 51 for image patterns. FIG. 21 illustrates an example of the database 51. The database 51 includes image patterns 1 to 3. The image patterns 1 to 3 each have multiple segments similar to those in the dot region 41. In each of the image patterns 1 to 3, at least one of the multiple segments arranged in the i direction is expressed with the value "0", whereas the remaining segments are expressed with the value "1". In the database 51, the number of segments expressed with the value "1" (referred to as "ON segments" hereinafter) and the number of segments expressed with the value "0" (referred to as "OFF segments" hereinafter) are written for each image pattern.

After the amount of toner in the code image is measured by the toner-amount sensor 15, the controller 11 determines whether or not the measured amount of toner is smaller than a first threshold value. The first threshold value is, for example, a minimum amount of toner required for reading an image formed of the invisible toner. If the amount of toner measured by the toner-amount sensor 15 is smaller than the first threshold value, the controller 11 (an example of a selecting unit) selects an image pattern having a larger number of ON segments than the dot region 41 after the conversion in step S3. For example, if the values in the dot region 41 are converted similarly to those in the image pattern 1 in step S3, the controller 11 selects the image pattern 2 having a larger number of ON segments than the image pattern 1. During the process for forming a subsequent code image, the controller 11 converts the values in the dot region 41 in accordance with the image pattern 2.

After the color values of the code image are measured by the color sensor 16, the controller 11 determines whether or not the measured color values are larger than a second threshold value. The second threshold value is, for example, an upper limit of a value indicating a color that can be considered as being transparent. If the color values measured by the color sensor 16 are larger than the second threshold value, the controller 11 (an example of a selecting unit) selects an image pattern having a larger number of OFF segments than the dot region 41 after the conversion in step S3. For example, if the values in the dot region 41 are converted similarly to those in the image pattern 1 in step S3, the controller 11 selects the image pattern 3 having a larger number of OFF segments than the image pattern 1. During the process for forming a subsequent code image, the controller 11 converts the values in the dot region 41 in accordance with the image pattern 3.

The image forming apparatus 1A may either include the toner-amount sensor 15 or the color sensor 16. In the case where the image forming apparatus 1A includes the toner-amount sensor 15, when the amount of toner is measured by the toner-amount sensor 15, the controller 11 determines whether or not the measured amount of toner is larger than a third threshold value. The third threshold value is, for example, an upper limit of an amount of toner by which a code image formed of the invisible toner is difficult to visually recognize. If the amount of toner measured by the toner-amount sensor 15 is larger than the third threshold value, the controller 11 selects an image pattern with a larger number of OFF segments than the dot region 41 after the conversion in step S3. During the process for forming a subsequent code image, the controller 11 converts the values in the dot region 41 in accordance with the selected image pattern.

Fourth Modification

In the toner-amount distribution 44 shown in FIG. 9, the amount of toner in the dot region 41 is entirely greater than the minimum amount T of toner required for reading an image. However, the amount of toner in the dot region 41 may partially be smaller than the minimum amount T of toner.

Fifth Modification

The image forming apparatus 1 performs the process shown in FIG. 4 when forming a code image and performs a normal image forming process when forming a color image other than a code image. In the normal image forming process, a color image is formed by using at least one of color toners of yellow, magenta, cyan, and black colors. During the normal image forming process, the controller 11 does not perform the segmentation in step S2 and the conversion in step S3.

Sixth Modification

In the image data acquired in step S1 in the exemplary embodiment, the dot region 41 of the code image is expressed with the value "1", and the background region is expressed with the value "0". However, the dot region 41 and the background region may be expressed with two values other than "0" and "1".

Seventh Modification

The controller 11 may include an application specific integrated circuit (ASIC). In this case, the function of the controller 11 may be achieved by the ASIC alone or by both the ASIC and the CPU.

Eighth Modification

The program for achieving the function of the controller 11 may be stored in a computer-readable storage medium, such as a magnetic storage medium (e.g., a magnetic tape, a magnetic disk (hard disk drive (HDD), flexible disk (FD)), etc.), an optical storage medium (e.g., an optical disk (compact disc (CD), digital versatile disk (DVD), etc.), a magneto-optical storage medium, or a semiconductor memory, and may be installed in the image forming apparatus 1. Alternatively, the program may be installed by being downloaded via a communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    an acquiring unit that acquires image data expressing an image region included in an image with a first value and a background region included in the image with a second value;
    a segmenting unit that segments the image region expressed with the first value in the acquired image data into a plurality of segments arranged in a fast scanning direction;
    a converting unit that converts a value of at least one of the plurality of segments arranged in the fast scanning direction into the second value;
    an output unit that generates an image signal on the basis of the image data, in which the value of the at least one segment is converted, and outputs the image signal;
    an exposure unit that exposes a charged image bearing member to light according to the output image signal by scanning the light thereto in the fast scanning direction so as to form a latent image; and a developing unit that forms the image by developing the formed latent image using an invisible toner that absorbs infrared light or ultraviolet light;

a memory that stores a plurality of image patterns each having the plurality of segments, each image pattern expressing at least one of the plurality of segments arranged in the fast scanning direction with the second value and expressing the remaining segment or segments with the first value;

a transfer unit that transfers the image formed by the developing unit to a transfer medium;

a first measuring unit that measures an amount of the invisible toner that forms the image transferred to the transfer medium by the transfer unit; and a selecting unit that selects an image pattern having a larger number of segments expressed with the first value than the image region, in which the value of the at least one segment is converted by the converting unit, from the plurality of image patterns stored in the memory if the amount of the invisible toner measured by the first measuring unit is smaller than a first threshold value, wherein the converting unit converts values of the plurality of segments in accordance with the image pattern selected by the selecting unit.

2. The image forming apparatus according to claim 1, wherein the segmenting unit segments the image region into a plurality of segments arranged in the fast scanning direction and a slow scanning direction, and wherein the converting unit converts a value of every other segment into the second value so that adjacent segments are expressed with different values.

3. The image forming apparatus according to claim 2, wherein the converting unit converts a value of a segment other than a segment located at an end in the fast scanning direction into the second value.

4. The image forming apparatus according to claim 3, wherein the image region is rectangular, and wherein the converting unit converts a value of a segment other than segments located at four corners of the image region into the second value.

5. The image forming apparatus according to claim 2, wherein the image region is rectangular, and wherein the converting unit converts a value of a segment other than segments located at four corners of the image region into the second value.

6. The image forming apparatus according to claim 1, wherein the segmenting unit segments the image region into a plurality of segments arranged in the fast scanning direction and a slow scanning direction, and wherein the converting unit converts values of the plurality of segments for every other column into the second value so that a plurality of first segments arranged in the slow scanning direction and a plurality of second segments arranged in the slow scanning direction and adjacent to the first segments are expressed with different values.

7. The image forming apparatus according to claim 6, wherein the converting unit converts a value of a segment other than a segment located at an end in the fast scanning direction into the second value.

8. The image forming apparatus according to claim 7, wherein the image region is rectangular, and wherein the converting unit converts a value of a segment other than segments located at four corners of the image region into the second value.

9. The image forming apparatus according to claim 6, wherein the image region is rectangular, and wherein the converting unit converts a value of a segment other than segments located at four corners of the image region into the second value.

10. The image forming apparatus according to claim 1, wherein the converting unit converts a value of a segment other than a segment located at an end in the fast scanning direction into the second value.

11. The image forming apparatus according to claim 10, wherein the image region is rectangular, and wherein the converting unit converts a value of a segment other than segments located at four corners of the image region into the second value.

12. The image forming apparatus according to claim 1, wherein the image region is rectangular, and wherein the converting unit converts a value of a segment other than segments located at four corners of the image region into the second value.

13. The image forming apparatus according to claim 1, further comprising a second measuring unit that measures a color value indicating a color in the image transferred to the transfer medium by the transfer unit, wherein the selecting unit selects an image pattern having a larger number of segments expressed with the second value than the image region, in which the value of the at least one segment is converted by the converting unit, from the plurality of image patterns stored in the memory if the color value measured by the second measuring unit is larger than a second threshold value.

14. An image forming method comprising:

acquiring image data expressing an image region included in an image with a first value and a background region included in the image with a second value;

segmenting the image region expressed with the first value in the acquired image data into a plurality of segments arranged in a fast scanning direction;

converting a value of at least one of the plurality of segments arranged in the fast scanning direction into the second value;

generating an image signal on the basis of the image data, in which the value of the at least one segment is converted, and outputting the image signal;

scanning light according to the output image signal in the fast scanning direction so as to expose a charged image bearing member to the light and form a latent image thereon; and forming the image by developing the formed latent image using an invisible toner that absorbs infrared light or ultraviolet light;

Storing, in a memory, a plurality of image patterns each having the plurality of segments, each image pattern expressing at least one of the plurality of segments arranged in the fast scanning direction with the second value and expressing the remaining segment or segments with the first value;

transferring the image formed to a transfer medium;

measuring an amount of the invisible toner that forms the image transferred to the transfer medium; and selecting an image pattern having a larger number of segments expressed with the first value than the image region, in which the value of the at least one segment is converted, from the plurality of image patterns stored in the memory if the amount of the invisible toner measured is smaller than a first threshold value, wherein the converting comprises converting values of the plurality of segments in accordance with the image pattern selected.

* * * * *